Figure 7:
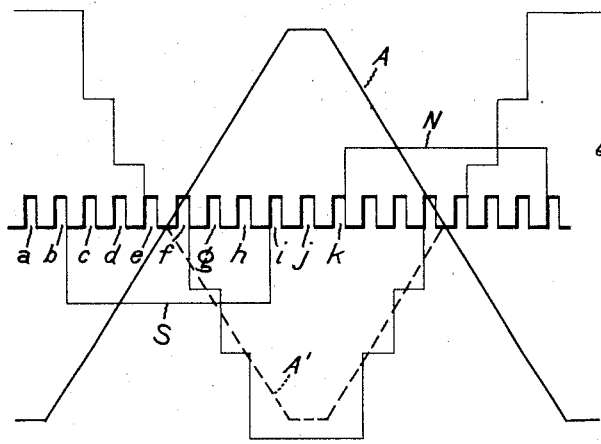

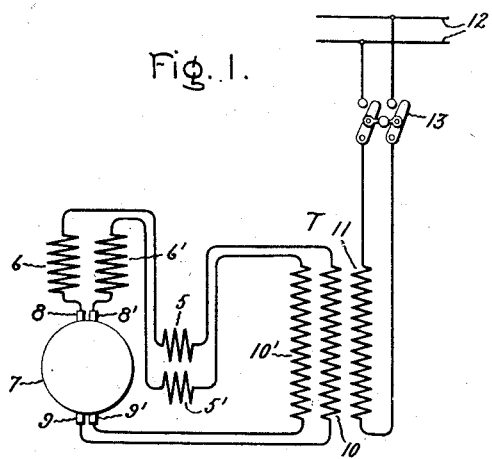
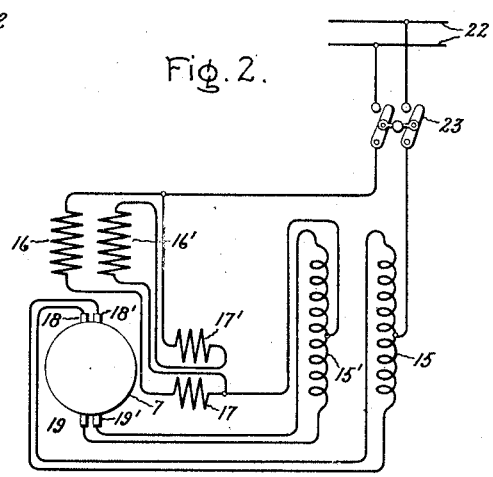
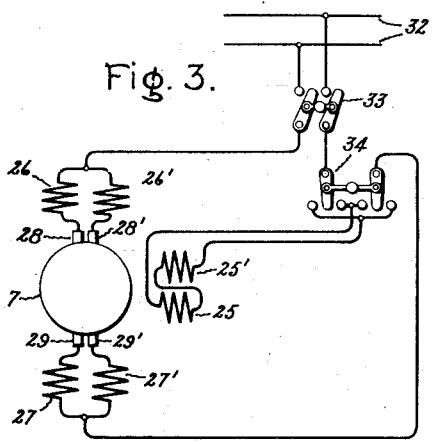
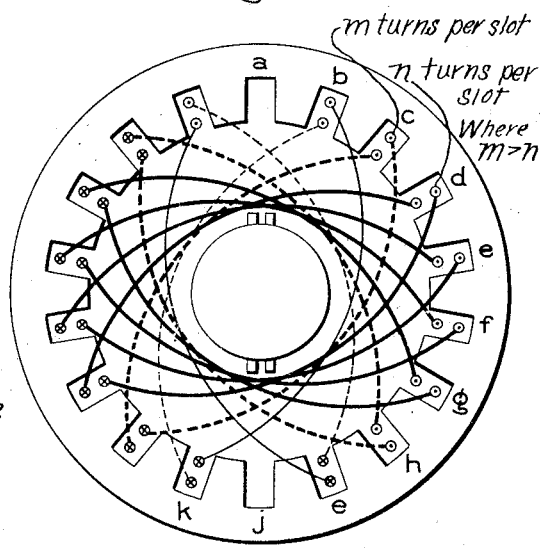
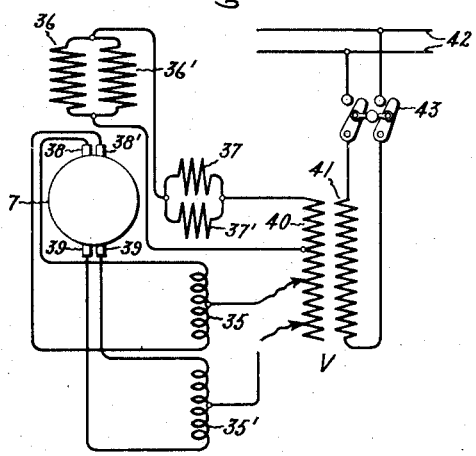

W. C. KORTHALS-ALTES.
COMPENSATED SERIES ALTERNATING CURRENT MOTORS.
APPLICATION FILED DEC. 22, 1917.

1,359,855.

Patented Nov. 23, 1920.
2 SHEETS—SHEET 2.

Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

COMPENSATED SERIES ALTERNATING-CURRENT MOTORS.

1,359,855.   Specification of Letters Patent.   Patented Nov. 23, 1920.

Application filed December 22, 1917. Serial No. 208,506.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Compensated Series Alternating-Current Motors, of which the following is a specification.

My invention relates to alternating current dynamo electric machines, particularly to those of the commutator type, and has for its object a new and improved arrangement of the circuits thereof whereby the machine may be readily and economically constructed and operated.

More specifically this invention relates to a series connected commutator type of machine; the object being to provide an arrangement of the circuits which permits an economical use of the materials entering into the construction, both of the machine proper and its commutator.

In the design of commutator machines, in order to keep the sparking down at starting it is necessary to use narrow brushes. In order also to utilize the commutator efficiently, it is necessary to use a large number of studs holding the brushes.

In applying these principles of design to a machine intended for large output, an economical design of the commutator means a large number of brush studs and consequently a large number of poles; the output per pole being relatively small. An economically designed machine having a small output per pole would have a very narrow air gap between the poles and the rotor, and in the case of a machine intended for large output, the air gap becomes reduced to mechanically impractical dimensions.

By the use of my invention a commutator machine intended for large output may still be designed both to utilize the commutator efficiently and to have an air-gap permitting economical design without resort to mechanically impractical dimensions, because I make use of an arrangement of circuits which reduces the number of poles without reducing the number of brush studs.

In carrying my invention into effect I make use of what is in effect two parallel circuits in the machine, each having a set of brushes on the commutator and some portion thereof connected in series with the brushes and may include the exciting winding and a compensating winding when desired, such portion being at some point differentially inductively related to the parallel portion so as to prevent the unequal growth of current in either circuit and also to prevent local short circuits between the brushes. The portions of the circuits including the exciting or compensating windings need not always be electrically parallel but may be in series and are arranged for employing two brushes per pole where before but one was used.

Figure 8:
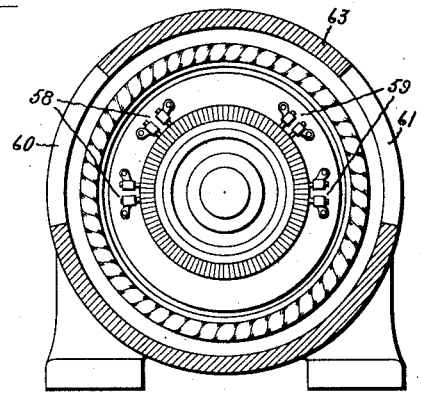
Figure 5:
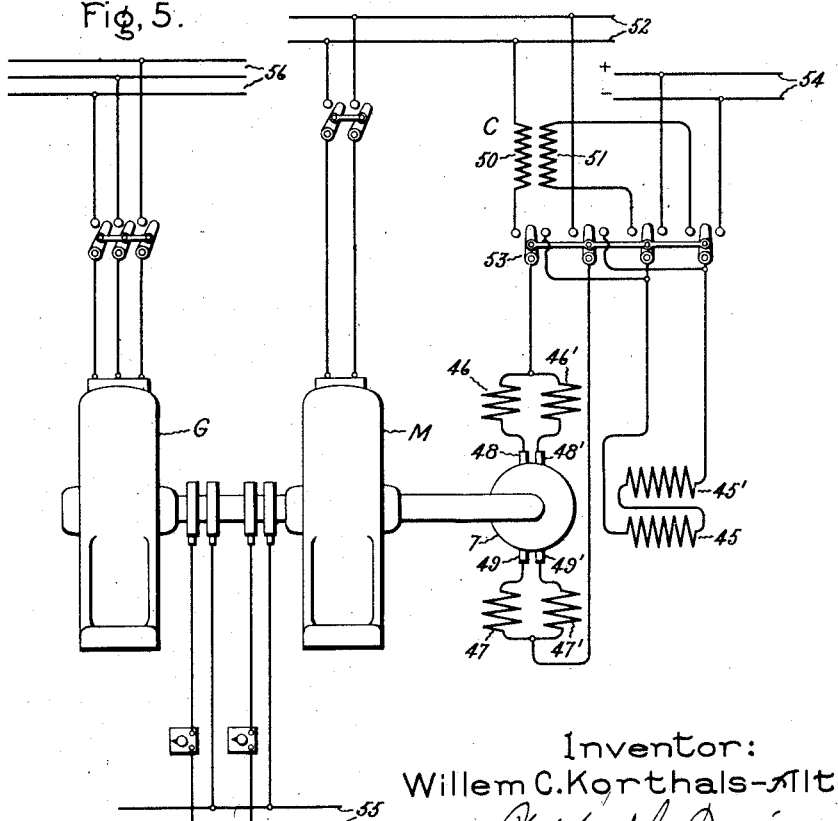

For a more exact understanding of the nature and objects of my invention, reference should be had to the following detailed description when taken in connection with the accompanying drawing in which Figure 1 shows, in diagrammatic fashion, one embodiment of my invention employing a series commutator machine having parallel circuits. Figs 2 to 4 show modified arrangements of the circuits for a commutator machine, which embody my invention. Fig. 5 shows still another modification, in which the commutator machine is mechanically coupled to a frequency changing set. Fig. 6 is an explanatory diagram indicating an arrangement of stator windings for the machine shown in Fig. 1. Fig. 7 is also an explanatory diagram indicating the manner in which the armature reaction is compensated by the arrangement of the stator windings shown in Fig. 6; and Fig. 8 is a view showing an improved arrangement of the brushes obtainable in the practice of my invention.

Referring now to Fig. 1, the commutator machine is indicated as having two electrically independent circuits each having an exciting winding 5 and 5' and a compensating winding 6 and 6' connected in series, and in series with the common commutated winding on the armature 7, the connections thereto being through the two parallel sets of brushes 8, 9 and 8', 9'.

Each circut is independently fed with electrical energy from separate secondary windings 10 and 10' respectively on the transformer T whose primary 11 is connected across the single phase supply mains 12 through the double pole switch 13.

By the use of electrically independent circuits, local short circuits through the brushes and armature windings are thus prevented.

A further advantage incidental to the use of the parallel circuits and the two sets of brushes for commutator machines is the improvements of the commutation, because the current is not reversed in the coil short circuited, but is reversed in the neutral position between the two adjacent brushes so that the current changes from full value to zero, passes through neutral, then changes from zero to full value in the opposite direction.

Still another advantage results from the use of parallel circuits in this type of machine for I have found that the stator winding can be distributed in such a manner as to compensate for the armature reaction and thereby be wound into a slotted stator frame of the induction motor type which greatly facilitates manufacture.

An arrangement of the stator windings wound into the slots of a stator frame, for the machine shown in Fig. 1, is shown in Fig. 6.

The winding shown is a full pitch winding of the lap type; the coils composing the two circuits overlapping so that there are two coil-ends in each of the eighteen slots constituting mechanically a single stator winding, a part of which serving as the exciting turns being shown in light lines, the other part serving as the compensating winding being shown in heavy lines.

The best compensation which I have observed was obtained by making the angle of neutral between the exciting turns somewhat greater than the angle between adjacent brushes which was done by leaving one slot per pole empty, as indicated at $a$ and $j$.

By the use of coils containing two different numbers of turns I am able to have a varying number of turns per slot so that the armature reaction may be exactly compensated over a certain angle about the circumference of the armature for each pole and over-compensated over the remaining angle. As an example let us assume that the coils shown in full lines have 5 turns each, while those shown in dotted lines have 7 turns each; the usual convention of dots and crosses being employed to represent current flowing respectively out of and into the plane of the drawing.

The exciting winding is shown accordingly as consisting of 12 turns in slot $b$; the corresponding ampere-turns being denoted by the ordinate adjacent slot $b$ in Fig. 7. In like manner the ordinate adjacent slot $i$, in Fig. 7, indicates the 12 turns shown in this slot in Fig. 6, etc., so that we have loops S and N indicating the distribution of the exciting flux over the stator slots.

Assuming now that the undulatory curve A, in Fig. 7, denotes the relative ampereturns of the armature reaction; it is seen that the four slots $d$, $e$, $f$ and $g$ each contain 10 turns which completely compensate for the armature reaction adjacent that portion of the stator, while the remaining slots $c$ and $h$ have 14 turns so that we have over-compensation over that portion of the stator adjacent the brushes, as clearly indicated by the inverted broken portion of the curve denoted A', the over-compensation being here desirable because of its assistance to commutation.

The turns in the remaining stator slots similarly compensate the armature reaction adjacent the other pole of the machine, as indicated in Fig. 7.

The arrangement of the stator windings just described not only provides the desired compensations and aids commutation when the machine is operated as an alternating current machine, but it also results in a winding which is properly proportioned for economical and sparkless operation of the machine when operated as a direct current machine.

Where a transformer, having two independent secondaries which permit the differential inductive action through the independent parallel connection for the circuits of the machine, is not available or undesirable I may make use of external reactance connected in the parallel circuits of the machine but fed electrically at their mid-point in the manner shown in Fig. 2, to prevent local short-circuits through the brushes.

In Fig. 2, two external reactances 15 and 15' are shown having their terminals respectively connected to brushes of like polarity; the terminals of reactance 15 being connected to brushes 18 and 18' while those of reactance 15' are connected to brushes 19 and 19'.

The middle point of reactance 15 is connected to one side of the single phase supply mains 22. The other reactance 15' has its middle point connected to the other side of the mains 22 but through the parallel circuits including the compensating windings 16 and 16' and the exciting windings 17 and 17' respectively connected in series.

The connection from the middle point of these reactances to the supply mains 22 are shown as having the double-pole switch 23 inserted therein.

As a second alternative arrangement for the circuits of this type of machine where no transformer is used I may employ the connections shown in Fig. 3.

In this form, I propose to divide each compensating winding into two portions as indicated at 26, 27 and 26', 27' a portion being connected in series with each brush 28, 29, 28' and 29' respectively; such an arrangement providing sufficient impedance by their differential inductive action to prevent any local currents flowing between the brushes.

The portions of the compensated windings, denoted 26 and 26' are shown as connected in parallel to one side of the single phase supply mains 32; the other portions 27 and 27' being connected in parallel through the exciting windings 25 and 25', which are in series, to the other side of the main 32. A double pole switch 33 is also shown as inserted in these connections to the mains.

A double throw double pole switch, such as shown at 34, may conveniently be employed to change the polarity of exciting windings 25 and 25' in the connections from windings 27 and 27' to one side of the mains 32 where it is desired to provide a reversing arrangement for the machine when operated as a motor.

One blade of the switch 34 is shown connected to the terminals of windings 27 and 27', the other being connected to one side of the mains; the double poles of this switch being connected in inverse order to the respective leads of the exciting windings 25 and 25' which are in series.

Another arrangement utilizing two circuits in a commutator machine, connected to give a series-repulsion arrangement is shown in Fig. 4.

In this form, brushes of like polarity such as shown at 38, 38' and at 39, 39' are connected across the terminals of two external reactances 35 and 35' to prevent local short circuits. The middle points of these reactances are then short-circuited through several turns of the secondary 40 of the transformer V in order to provide two parallel circuits for the machine operating as a repulsion motor. The primary 41 of the transformer V is connected across the mains 42; the connections having a double pole switch 43 inserted therein.

The parallel connected exciting windings 37 and 37' are connected in series with the parallel connected portions 36 and 36' of the compensating windings and in series with a portion of the secondary 40.

A still further arrangement for the circuits of this type of machine which may be employed with advantage when it is desired to use it as a starting motor for a frequency changing set, is shown in Fig. 5.

The armature 7 is indicated as mechanically coupled to the driving shaft of the motor generator set serving as a frequency changing set in which M denotes the motor, and G, the generator.

Here the divided compensating windings are again used, the portions 46 and 46' being connected to brushes 48 and 48', and the portions 47 and 47' to brushes 49 and 49' so as to form parallel circuits. One side of the single phase mains 52 is connected to the portions 46 and 46', the other side being connected to the portions 47 and 47'.

A current transformer C has its primary 50 connected in series with one of these connections to mains 52, its secondary 41 being connected to the exciting windings 45 and 45' which are in series.

The two connections to the mains 52 and the two connections to the secondary winding 51 are simultaneously controlled by the four pole double thrown switch 53. In its left hand position this switch connects the armature 7 and its compensating windings across the mains 52 and the exciting windings 45 and 45' across the secondary 51 of transformer C, so that the commutator machine will operate as a motor fed with electric energy from the mains 52. In the right hand position, the switch 53 connects the armature 7 and its compensating windings across the direct current busses 54 and the exciting windings 45 and 45' in shunt therewith.

These busses 54 may be a second source of power from which the starting motor may be operated, or they may be busses to be supplied with direct current from the commutator machine operating as a generator after the motor-generator set has been brought up to synchronous speed and after the switch 53 has been thrown to disconnect the machine from mains 52 without mechanically disconnecting the machine from the driving shaft.

In this latter case the busses 54 and busses 55, which supply direct current for exciting the fields of both the motor M and the generator G, would preferably be electrically connected.

The motor-generator set, when operating as a frequency changer set, has the fields of the motor M and the generator G provided with different numbers of pole pieces; the motor M being represented as receiving single phase current at one frequency from mains 52 and the generator G as supplying polyphase current at a different frequency to the mains 56.

By the use of two circuits for a commutator machine, such as I have described above, a smaller commutator may not only be used, than would otherwise be required, but it permits a more expeditious arrangement of the brushes on large commutators where it is impractical to use studs for brushes all the way around the commutator on account of heating. In such case, the use of the two circuit arrangement of the windings permits the omission of brushes from one part of the commutator; such arrangement of the brushes being shown in Fig. 8, the brush supporting rings being omitted from the drawing for the sake of clearness.

In this figure the brushes 58 and 59 are shown as conveniently located opposite hand holes 60 and 61 in the motor frame 63 and omitted from the other part of the commutator; this particular arrangement being suitable for an 8-pole two-circuit series motor.

In operation, a two circuit series machine running as a motor has the usual series characteristics and is started and stopped by throwing the switch making and breaking the connections to the supply mains, such switches being shown at 13, 23, 33, 43 and 53.

Starting resistances may be employed where the starting torque would create undue mechanical strains if the machine running as a motor were thrown directly on to the supply mains. In the form shown in Fig. 1, the reactance of transformer T, however, would limit the starting current to a safe value.

While I have here shown and described several embodiments of my invention which are at present the best means known to me for carrying the same into effect, I would have it understood that they are merely illustrative and that I do not mean to be limited to the precise details disclosed, nor in the choice of recognized equivalents except as defined in my claims hereunto annexed.

What I claim as new and desire to secure by Letters Patent of the United States, is:—

1. In a dynamo electric machine, the combination with a commuted winding having parallel sets of coöperating brushes, of parallel sets of compensating and exciting windings connected in circuits operatively related to said commuted winding, portions of said circuits being connected in series with said brushes and in differential inductive relation with each other.

2. In a dynamo electric machine the combination with a commuted winding having two coöperating sets of brushes, of compensating and exciting windings arranged in operative relation to said commuted winding; said brushes being connected in series with said windings to form independent parallel circuits, portions of said parallel circuits being arranged in differential inductive relation.

3. In a dynamo electric machine, the combination with a commuted winding having two coöperating sets of brushes, of two separate compensating windings connected to said brushes in parallel to form two circuits in the machine, and two exciting windings connected in operative relation with said circuits and to electrical supply mains; portions of said parallel circuits being arranged in differential inductive relation.

4. In a dynamo electric machine, the combination with a commuted winding having two coöperating sets of brushes, of two separate compensating windings connected to said brushes in parallel to form two circuits in the machine, two exciting windings and a transformer having two secondaries; each of said circuits being connected to have one exciting winding and one secondary of the transformer in series therewith.

5. In a dynamo electric machine, the combination with a commuted winding having two coöperating sets of brushes, of two separate compensating windings connected to said brushes in parallel to form two circuits in the machine, and two exciting windings connected in operative relation with said circuits and to electrical supply mains, said circuits having electrically parallel portions arranged in differential inductive relation, and a slotted stator frame on which said compensating and exciting windings are wound so as to form a single distributed stator winding.

6. In a dynamo electric machine, the combination with a commuted winding having two coöperating sets of brushes, of two separate compensating windings connected to said brushes in parallel to form two circuits in the machine, and two exciting windings connected in series with said circuits and to electrical supply mains, said circuits having electrically parallel portions arranged in differential inductive relation, and a slotted stator frame on which said compensating and exciting windings are wound so as to form a single distributed stator winding; said stator winding being so assembled and disposed in said stator frame as to completely compensate for the armature reaction over portions of said commuted winding and to over-compensate the armature reaction over the remaining portions.

7. In a dynamo electric machine, the combination with a commuted winding having two coöperating sets of brushes, of two separate compensating windings connected to said brushes in parallel to form two circuits in the machine, two exciting windings each connected in series with one of said circuits, and a slotted stator frame; said compensating and exciting windings comprising a plurality of full pitch coils of varying numbers of turns distributed on said stator frame so as to secure a desired order of compensation for the armature reaction and to secure a greater angle of neutral than that between two adjacent brushes.

8. In a multi-polar dynamo electric machine, the combination with a commuted winding having two coöperating sets of brushes, of two separate compensating windings connected to said brushes in parallel to form two circuits in the machine, and two exciting windings connected in series with said circuits, said circuits having electrically parallel portions arranged in differential inductive relation; said brushes being omitted from certain portions of the commutator for said commuted winding and concentrated on other portions of said commutator.

In witness whereof, I have hereunto set my hand this 21st day of December, 1917.

WILLEM C. KORTHALS-ALTES.